April 7, 1931. G. F. HITCHCOCK Re. 18,029

AIR RELEASE VALVE

Original Filed April 16, 1926 2 Sheets-Sheet 1

Inventor
Guy F. Hitchcock

By Hardway & Cathey
Attorneys

April 7, 1931. G. F. HITCHCOCK Re. 18,029

AIR RELEASE VALVE

Original Filed April 16, 1926 2 Sheets-Sheet 2

Inventor
Guy F. Hitchcock

By Hardway & Cathey
Attorneys

Reissued Apr. 7, 1931

Re. 18,029

UNITED STATES PATENT OFFICE

GUY F. HITCHCOCK, OF HOUSTON, TEXAS, ASSIGNOR OF ONE-THIRD TO JOE L. TOMLINSON AND ONE-THIRD TO THOMAS H. MEEKS, OF HARRIS COUNTY, TEXAS

AIR-RELEASE VALVE

Original application filed April 16, 1926, Serial No. 102,373. Renewed August 27, 1928. Original No. 1,691,891, dated November 13, 1928. Application for reissue filed November 13, 1930. Serial No. 495,409.

This invention relates to new and useful improvements in an air-release valve.

One object of the invention is to provide a novel type of release valve, adapted to be applied directly to an air pressure reservoir, or to the extension pipe, leading therefrom forming part of the air brake system of railway trains, and whereby the air pressure may be easily relieved from said reservoir.

Another object is to provide an air release valve of the type disclosed which will be very easy to open by reason of the fact that the air pressure in the tank does not resist the opening of the valve.

A further object of the invention is to provide an air release valve of the character described which is of very simple construction, and may be easily operated and readily applied.

With the above and other objects in view, this invention has particular relation to certain novel features of construction, operation and arrangement of parts, an example of which is given in this specification and illustrated in the accompanying drawings, wherein:—

Figure 1:
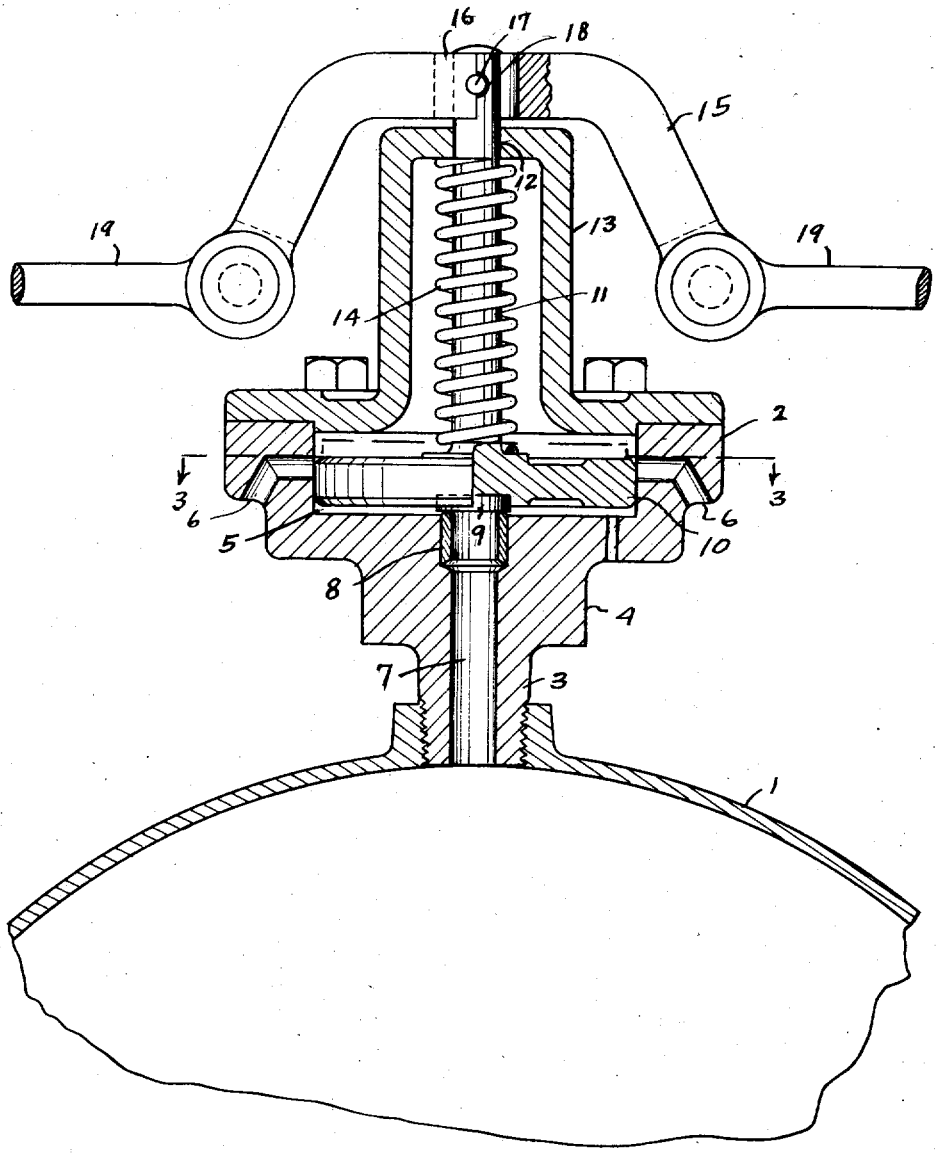
Figure 1 shows a vertical sectional view of the valve as applied to an air pressure reservoir.
Figure 2:
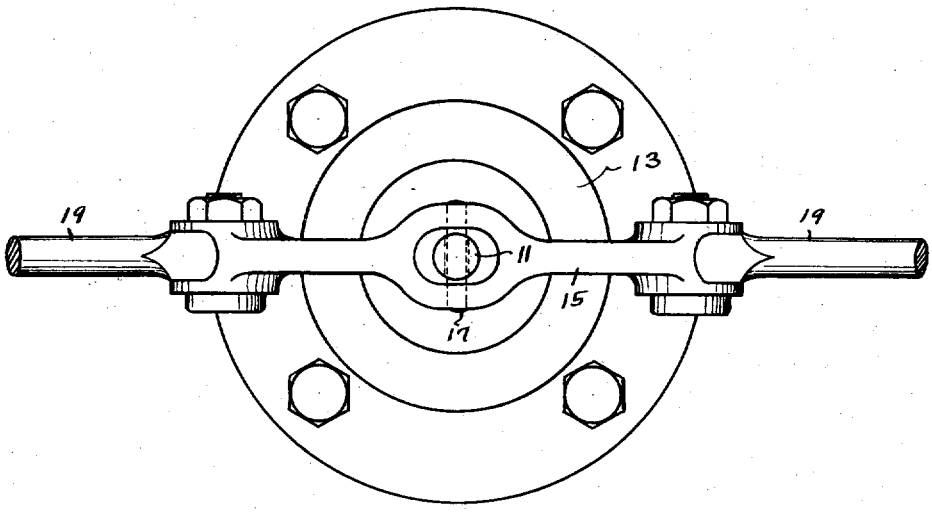
Figure 2 shows a plan view.
Figure 3:
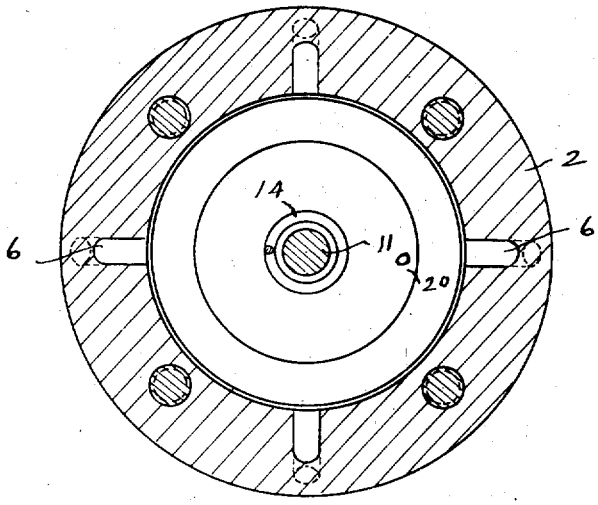
Figure 3 shows a cross sectional view, taken on the line 3—3 of Figure 1.

Referring now more particularly to the drawings, wherein like numerals of reference designate similar parts in each of the figures the numeral 1 designates the air pressure reservoir. There is a valve casing 2 one end 3 of which is reduced and threaded and thus adapted to be screwed into a tapped hole in the reservoir or to an air line connected therewith. Beyond the reduced end 3 the casing is preferably of polygonal shape, as at 4, to receive a wrench for screwing the valve into place.

The outer part of the valve casing is formed into a cylinder 5, having the lateral relief ports 6. An air relief conduit 7 leads through the casing 2 from the interior of the reservoir and terminates in the cylinder 6. Driven into the outer end of the relief conduit 7 there is a tubular valve seat 8 whose outer end is formed with a knife edge and a valve 9 cooperates with said seat to normally close the relief conduit.

This valve is carried by the under side of the piston 10 which works in the cylinder 5. Fastened to the piston 10 there is an outstanding stem 11, which works through a bearing 12 in the cap 13. This cap is bolted onto the casing 2 and encloses a coil spring 14 which surrounds the stem 11 and is interposed between the cap and piston and normally holds the valve 9 in closed position, also holding the piston 10 in position to close the ports 6.

There is a substantially arcuate yoke 15 having a central bearing 16 to receive the outer end of the stem 11 and provided with a cross pin 17, which works loosely in a cross bearing 18 in the outer end of the stem 11.

The operating rods 19, 19, are connected at their inner ends to the respective ends of the yoke 15 and the outer ends of the rods are accessible under the respective sides of the car beneath which the reservoir 1 is located.

Normally the air pressure in the reservoir will not be sufficient to lift the valve 9 and piston 10, on account of the small area of the valve 9, against which the pressure may operate. In order to relieve the pressure in the reservoir 1 either rod 19 may be pulled outwardly which will operate to elevate the corresponding end of the yoke 15, said yoke operating on the top of the cap 13, as a fulcrum, and the piston 10 is thereby slightly lifted to admit air into the cylinder 5 and on account of the large area of the piston against which the air under pressure, may now operate, the piston will be lifted, by said pressure, to uncover the ports 6 and the pressure in the reservoir will be immediately reduced to such a point that the air brake cylinder will automatically release the remaining pressure. Thereupon the spring 14 will force the piston 10 downwardly and seat the valve 9, forcing the air in the cylinder out through the small relief port 20 in the bottom of the cylinder. This relief port also prevents the accumulation of the air in the cylinder, which might leak past the valve 9, and prematurely lift the piston 10, and release the air pressure from the reservoir 1.

What I claim is:—

1. A valve including a valve casing, formed with a cylinder having a relief conduit entering the cylinder and a relief port leading therefrom, a piston in the cylinder normally closing said port, a valve carried by the piston normally closing said conduit, means normally holding said piston and valve in closed position and a manually operable yoke pivotally connected to the outer end of the piston whereby the same may be lifted to open said conduit and port.

2. A valve including a valve casing formed with a cylinder having an air inlet conduit and a relief port, a piston in the cylinder arranged to normally block said conduit and port, a yieldable member operating against the piston and normally holding the same seated and a yoke upon the outer end of the piston for lifting the piston to open said conduit and port.

3. A valve including a valve casing formed with a cylinder and having a pressure relief conduit entering the cylinder and a pressure relief port leading from said cylinder, a bearing member fastened on said casing having a bearing, a piston in the cylinder adapted to close said port, a valve carried by the piston adapted to close said conduit, a stem connected to the piston and working through said bearing, a yieldable member interposed between said bearing member and piston, a yoke above the bearing member and having a pivotal connection with said stem and operating rods connected to the respective ends of said yoke.

4. A valve including a valve casing formed with a cylinder having an air relief conduit entering the cylinder and a plurality of air relief ports leading from the cylinder, a piston in said cylinder normally blocking said relief ports, said piston being formed with a valve which normally closes said relief conduit, a cap on said body formed with a bearing, a stem carried by the piston working through said bearing, a yieldable member operating against the piston and normally holding the same in position to close said relief ports and said relief conduit, and a yoke pivoted to the stem through which the piston may be lifted to open said conduit and ports.

5. A valve including a valve casing formed with a cylinder and having an air inlet conduit, a valve seat in the end of said conduit which terminates in the cylinder, said cylinder also having relief ports, a piston in said cylinder normally blocking said relief ports, a valve carried by the piston adapted to cooperate with said seat, a cap secured to said body and formed with a bearing, a stem carried by the piston and working through said bearing, a yieldable member interposed between said cap and piston, a yoke having a pivotal connection with the outer end of said stem and operating rods hinged to the respective ends of the yoke.

6. A valve mechanism including a casing formed with a cylinder and having a pressure relief conduit and an air relief port, a piston in the cylinder normally blocking said port and formed with a valve which normally blocks said conduit, a bearing member secured to said casing and having a bearing, a stem carried by the piston and working through said bearing, a yoke pivotally connected to the outer end of said stem, an operating rod pivotally connected to each end of the yoke, and a yieldable member acting against the piston and normally holding the same in position to block said port.

7. A valve mechanism including a casing formed with a cylinder and having a pressure relief conduit and an air relief port, a piston in the cylinder normally blocking said port and formed with a valve which normally blocks said conduit, a cap secured to said body and having a bearing, a stem carried by the piston and working through said bearing, a yoke pivotally connected to the outer end of said stem, operating means connected to each end of the yoke and a yieldable member acting against the piston normally holding the same in position to block said port.

8. A valve mechanism including a casing formed with a cylinder having a pressure relief conduit entering the cylinder and air relief ports leading from the cylinder, a piston in the cylinder normally blocking one of said ports and having a valve which normally blocks said conduit, means for manually moving said piston into one position to open the port normally blocked by it, and to simultaneously open said conduit and yieldable means through which the piston may be moved in the other direction to close the port controlled by the piston, the other port being at all times open.

9. An air release valve including a valve casing, a cylinder associated therewith having a relief conduit entering the same and a relief port leading therefrom, a movable member in the cylinder interposed between the conduit and port and shaped to close both conduit and port, when in one position, a yieldable element action to normally hold said member in said closed position, means on said member through which said member may be actuated into another position to open said conduit and port, and a manually operable device arranged to act on said means to move said member into said open position.

10. An air release valve including a casing and an associated cylinder, said cylinder having a relief conduit and an air relief port, a piston in the cylinder arranged to normally block said conduit and port, a yieldable member arranged to hold the piston in position to normally block said conduit and port, and a manually operable device arranged to lift the piston to operate said conduit and port.

11. A valve including a valve casing formed with a cylinder having an air inlet conduit and a relief port, a piston in the cylinder arranged to normally block said conduit and port, a yieldable member operating against the piston and normally holding the same seated and a yoke, at the outer end of the piston, for lifting the piston to open said conduit and port.

12. An air release valve including a valve casing, a cylinder associated with the casing and having an air relief conduit and a relief port, a seat in said device, a piston in the cylinder arranged to seat against said seat and to normally block said conduit and port, a yieldable member effective to normally hold the piston seated to close said conduit and port, manually operable means for moving the piston into position to open said conduit and port, said piston being so shaped that a greater area thereof will be exposed to the pressure of the fluid flowing through said conduit when opened than when closed.

13. An air release valve including a casing and an associated cylinder, said cylinder having a relief conduit and an air relief port, a piston in the cylinder arranged to normally block said conduit and port, a yieldable member arranged to hold the piston in position to normally block said conduit and port, and a manually operable device arranged to lift the piston to open said conduit and port, said piston being arranged so the pressure to be released will assist in lifting said piston, and will temporarily hold the piston in open position.

In testimony whereof witness my signature, this 8th day of November, A. D. 1930.

GUY F. HITCHCOCK.